455-296 SR
FIP8106 XR 3,453,565
X 5362 H

ADJUSTABLE HARMONIC TRAP WHOSE TUNING TRACKS
THE TUNING OF PASS BAND MEANS
Filed Aug. 16, 1967

INVENTOR.
RAYMOND J. CARLI
BY [signature]
ATTORNEY

3453565
OR IN 334/64

United States Patent Office 3,453,565
Patented July 1, 1969

3,453,565

ADJUSTABLE HARMONIC TRAP WHOSE TUNING TRACKS THE TUNING OF PASS BAND MEANS

Raymond J. Carli, Marion, Iowa, assignor to Collins Radio Company, Cedar Rapids, Iowa, a corporation of Iowa Filed Aug. 16, 1967, Ser. No. 660,947
Int. Cl. H03j *3/06, 5/02*
U.S. Cl. 334—64 4 Claims

ABSTRACT OF THE DISCLOSURE

A circuit capable of tuning a primary and a secondary circuit at the same time is disclosed. The second circuit may consist of a trap to eliminate harmonics of the signal to which the primary circuit is tuned.

This invention relates in general to tuning circuits and in particular to a harmonic trap which can be utilized to tune a first primary circuit while simultaneously tuning a second circuit so as to eliminate harmonic and spurious outputs.

It is an object of this invention to provide a tunable circuit controlled by a shaft which is capable of tuning a primary circuit while simultaneously tuning a harmonic trap in a supplemental circuit to block spurious and harmonic signals.

Another object of this invention is to provide an improved tuning circuit.

A feature of this invention is found in the provision for a pair of capacitor elements mounted on a rotatable shaft and rotatable relative to stators so as to simultaneously tune a pair of circuits in which the condensers are connected.

Further objects, features, and advantages of the invention will become apparent from the following description and claims when read in view of the accompanying drawings, in which:

Figure 1:
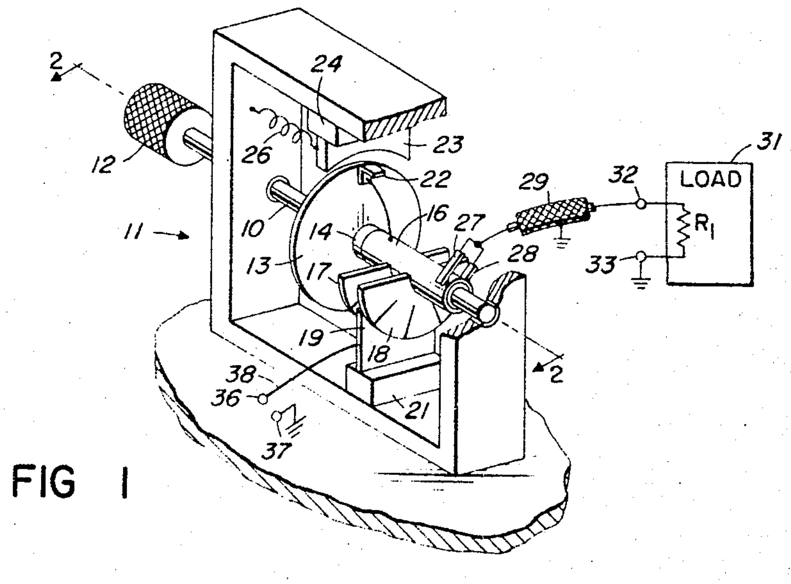
FIGURE 1 is a perspective view of the tuner of this invention.
Figure 2:
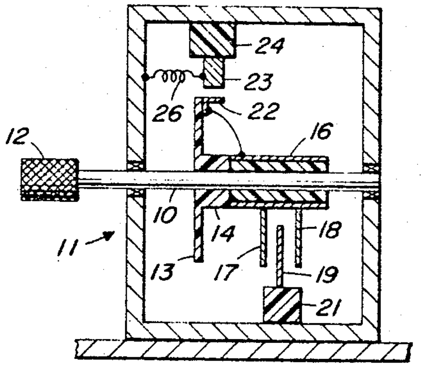
FIGURE 2 is a sectional view of the tuner taken on line 2—2 of FIGURE 1.

FIGURE 1 illustrates a shaft 10 rotatably supported in a frame 11 and which has a tuning knob 12. A disc of insulating material 13, formed of a suitable plastic, is attached to the shaft 10 and is formed with a hub 14 that extends a substantial distance along the shaft 10. A conductive sleeve 16 is mounted about the hub 14 and a pair of rotor coupling capacitor plates 17 and 18 are attached to the sleeve 16 and rotate with the shaft 10. A stator capacitor plate 19 is supported by an insulating support 21 from frame 11 and extends between the rotor plates 17 and 18.

A capacitive tab 22 is attached to the edge of the disc 13 and is electrically connected to sleeve 16 and provides a rotor for a second capacitor. A stator 23 of variable distance from the tab 22 is supported adjacent the tab 22 by an insulator 24 on frame 11 so that the capacitance varies between the stator 23 and the tab 22 as the shaft 10 is rotated. An inductor 26 ($L_1$) has one end connected to the stator 23 and the other end connected to the frame 11. The stator 23 and tab 22 form a variable capacitance which varies with rotation of shaft 10.

As shaft 10 is rotated, the capacitance between the rotor plates 17 and 18 and the stator 19 changes and simultaneously the capacitance of the second capacitor comprising tab 22 and stator 23 changes.

In a particular embodiment a power amplifier tube has its plate connected to the stator 19 and a load for a power amplifier is connected to sleeve 16 by wiper contacts 27 and 28 which connects to a lead 29. The load 31 has one side connected to terminal 32 which is connected to lead 29 and the other is connected to ground. To obtain efficient operation of the power amplifier tube, the shaft 10 is rotated by knob 12 until the power amplifier plate circuit is tuned by the capacitor formed by rotors 17 and 18 and stator 19. Simultaneously the inductance 26 and capacitor formed by tab 22 and stator 23 are tuned to series resonance to form a circuit of low impedance to certain harmonic or other spurious frequency so that they will pass to ground. Since the spacing and area of the condenser plates of the two capacitors may be varied, the capacitance of the two structures may be adjusted as desired so that the desired frequency response is obtained.

For example, if the tube is to supply power to load 31 at a first frequency $f_1$, the shaft is turned to tune the capacitor comprising rotor plates 17 and 18 and stator 19 until the plate circuit of the tube is tuned. The plate may be connected between grounded terminal 37 and terminal 36 and by lead 38 to stator plate 19.

Figure 3:
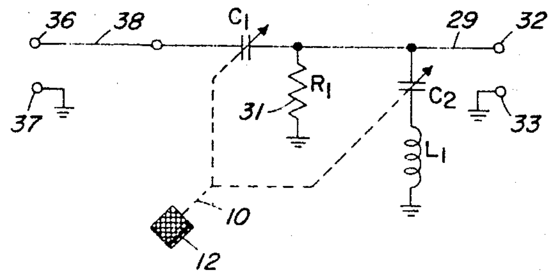
FIGURE 3 is a schematic of an application of the tuner according to this invention.

As shaft 10 is rotated to tune the main capacitor formed of plates 17, 18 and 19, the capacitor formed by tab 22 and plate 23 is also tuned. This capacitor ($C_2$) in the schematic of FIGURE 3 resonates with inductor $L_1$ at a frequency $f_2$ which is different than $f_1$ and allows signals at frequency $f_2$ to be shorted to ground. Capacitor $C_2$ and inductance $L_1$ are chosen so that this circuit tracks the tuning of the primary circuit and eliminates undesired signals.

It is seen that this invention provides means for simultaneously tuning a pair of circuits to maximize the output of the one frequency and to trap and eliminate spurious and undesired frequencies.

Although this invention has been described with respect to a particular embodiment thereof, it is not to be so limited, as changes and modifications may be made therein which are within the spirit and scope of the invention.

I claim:

1. In a tuning circuit, tuning means comprising a frame member, a shaft rotatably supported by said frame member, a first capacitor including at least one capacitor plate insulatingly mounted on said shaft and a first capacitor stator attached to said frame, an insulative disk mounted on said shaft, and a second capacitor having substantially less capacitance than said first capacitor including a tab mounted on the periphery of said insulative disk and a second capacitor stator mounted on said frame, said first and second capacitors being adjustable over related capacitance ranges as said shaft is rotated.

2. In a tuning circuit, tuning means as defined by claim 1 and further including a conductive sleeve insulatingly mounted on said shaft, and said at least one capacitor plate being mounted on said conductive sleeve.

3. In a tuning circuit, tuning means as defined by claim 2 and further including conductive means for electrically connecting said tab and said conductive sleeve.

4. In a tuning circuit, tuning means as defined by claim 3 wherein said second capacitor stator is insulatingly mounted on said frame, and further including inductive means electrically connecting said second capacitor stator to said frame.

(References on following page)

References Cited

UNITED STATES PATENTS

| | | | |
|---|---|---|---|
| 1,609,162 | 11/1926 | Diehl | 325—473 |
| 2,005,772 | 6/1935 | Chireix | 334—64 X |
| 2,700,730 | 1/1955 | Prew | 334—83 X |
| 2,762,924 | 9/1956 | Slate | 334—64 X |

HERMAN KARL SAALBACH, *Primary Examiner.*

P. L. GENSLER, *Assistant Examiner.*

U.S. Cl. X.R.

325—473; 333—76; 334—82, 83